United States Patent
Fagerburg (12)

(10) Patent No.: US 6,368,724 B1
(45) Date of Patent: *Apr. 9, 2002

(54) COPOLYESTER CONTAINING ISOPHTHALIC ACID, 1,4-CYCLOHEXANEDIMETHANOL AND AN ULTRAVIOLET LIGHT ABSORBING COMPOUND AND ARTICLES MADE THEREFROM

(75) Inventor: David Richard Fagerburg, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/459,500

(22) Filed: Dec. 13, 1999

(51) Int. Cl.$^7$ .......................... B32B 27/18; B32B 27/36; B32B 27/08
(52) U.S. Cl. ...................... 428/480; 528/302; 528/305; 528/308; 528/308.6; 524/86; 524/91; 524/94
(58) Field of Search .................. 428/480; 528/302, 528/305, 307, 308, 308.1, 306.6; 524/86, 91, 94

(56) References Cited

U.S. PATENT DOCUMENTS

| | | |
|---|---|---|
| 4,446,262 A | 5/1984 | Okumura et al. |
| 5,108,835 A | 4/1992 | Hähnsen et al. |
| 5,251,064 A | 10/1993 | Tennant et al. |
| 5,264,539 A | 11/1993 | Shepherd |
| 5,480,926 A | 1/1996 | Fagerburg et al. |
| 5,558,912 A | 9/1996 | Fagerburg et al. |
| 5,654,083 A | 8/1997 | Venema |
| 5,709,929 A | 1/1998 | Venema |
| 5,783,307 A | 7/1998 | Fagerburg et al. |
| 5,852,164 A | 12/1998 | Akai et al. |
| 6,218,450 B1 * | 4/2001 | Fagerburg ..................... 524/91 |

FOREIGN PATENT DOCUMENTS

| | | |
|---|---|---|
| EP | 0 595 413 A1 | 5/1994 |
| GB | 2 009 768 A | 6/1979 |

OTHER PUBLICATIONS

Ping–Sun R. Cheung and Carleton W. Roberts, "Synthesis, Photodegradation, and Energy Transfer in a Series of Poly-(ethylene Terephthalate–co–2,6–Naphthalenedicarboxylate) Copolymers", Journal of Applied Polymer Science, vol. 24, pp 1809–1830 (1979), John Wiley & Sons, Inc.

Jack A. Dellinger and Carleton W. Roberts, "Synthesis, Photodegradation, and Energy Transfer in a Series of Poly-(ethylne Terephthalate–co–4, 4'–Biphenyldicarboxylate) Copolymers", Journal of Applied Polymer Science, vol. 26, pp 321–342 (1981), John Wiley & Sons, Inc.

* cited by examiner

*Primary Examiner*—Vivian Chen
(74) *Attorney, Agent, or Firm*—Cheryl Tubach; Bernard Graves

(57) ABSTRACT

A copolyester blend resistant to ultraviolet radiation includes a polyethylene terephthalate based copolyester having 1,4-cyclohexanedimethanol; an effective amount of an ultraviolet radiation absorber selected from the group consisting of benzoxazinones, dimeric benzotriazoles, triazines and mixtures thereof; and from 5 mol % to about 40 mol % isophthalic acid residues present in the copolyester wherein the mole percent is based on 100 mole percent of dicarboxylic acid or equivalents. The copolyester blend is useful in making UV radiation resistant thermoformed articles.

23 Claims, No Drawings

COPOLYESTER CONTAINING ISOPHTHALIC ACID, 1,4-CYCLOHEXANEDIMETHANOL AND AN ULTRAVIOLET LIGHT ABSORBING COMPOUND AND ARTICLES MADE THEREFROM

BACKGROUND OF THE INVENTION

1. Field of the Invention

The present invention relates to blends of certain copolyesters and an ultraviolet light (UV) absorbing compounds which can be used in connection with sheets, films and other articles as an overlying layer in order to improve the weatherability of an underlying substrate.

2. Background of the Invention

Polymer compositions and particularly polymer compositions suitable for thermoforming have found wide spread acceptance and utility in home, commercial and industrial applications. Many polymeric materials have desirable mechanical and/or optical properties to allow their use for applications such as sheeting and formed parts in particular. Such applications range from outdoor signs, vending machine faces, carport covers, skylights, recreational vehicle covers, such as golf cart tops, off-road vehicle windshields such as for so-called ATV's and snowmobiles and the like, etc. It is well known in the art that polyesters are generally not very stable to the effects of UV radiation. This instability is manifest in a number of ways. The color of the polyester turns yellow, the impact resistance of the material is dramatically decreased and the surface glossiness of the article is diminished or becomes hazed. These problems have long limited the use of polyesters and must be solved in order for polyesters to be fit for articles used in an outdoor environment.

It is also well known in the art that an UV absorbing compound can be incorporated into the polyester article to retard the loss of impact resistance, yellowness development and haze. Generally, the UV absorbing compound has an extinction coefficient much higher than that of the polymer so that almost all of the incident UV radiation is absorbed by the UV absorbing compound rather than the polymer compound itself. The photostabilizers are generally divided into three groups: light screens, ultraviolet absorbers, and quenching compounds. The effects of the latter group, i.e., the quenching compounds, can be explained by the mechanism of energy transfer between the excited polymer molecules and the photostabilizer via dipole-dipole interactions.

Two strategies have evolved for protecting the polyester from the effects of UV radiation: 1) using an acrylic-based polymer layer containing an UV absorber to protect the underlying polyester material, and 2) using a high loading of an UV absorber incorporated directly into a polyester material, which would then be incorporated as a thin layer on the surface of the polyester sheeting material. However, both of these methods are not without their problems.

A serious problem with incorporating a strong UV absorber added to the acrylic layer in order to screen harmful UV radiation from the underlying polymeric material is the differences in rheological characteristics of the polyester substrates and the acrylic material. Another problem is the difference in melt temperatures of the two materials. This usually limits how such constructions are made to the lamination of a film of the acrylic material onto the polymeric substrate during its extrusion which tends to be more costly than a coextrusion process. A serious problem with this methodology is one of eventual delamination, especially in the conditions of high humidity and heat. Delamination, of course, renders the construction useless.

Another problem with using an acrylic protective layer coating is that often the acrylic material is itself very brittle when impacted or bent. Polyesters and copolyesters, while very tough in general, also are known to be generally notch sensitive. That is, when a small notch or scratch is introduced into the surface, the energy required for impact failure is reduced by more than an order of magnitude and the sheeting effectively becomes brittle. As a result of this notch sensitivity, when a brittle acrylic layer is intimately bonded with the underlying polyester or copolyester, a crack initiated in the acrylic layer is quickly and efficiently propagated through the polyester or copolyester substrate. Thus, the entire structure is as brittle as the protective acrylic film even before exposure to weathering.

In the second category, using a polyester layer having an effective level of an ultraviolet light absorbing compound, overcomes many of the problems associated with using an acrylic protective layer. The melt rheologies of the polyester protective layer is very closely matched to that of the underlying material. Additionally the constructions are quite durable and are not brittle. However, this approach too has a deficiency. UV light is able to damage the polymer matrix in which the UV absorber is present, as the UV absorber cannot preferentially absorb 100% of the incident light. That portion of the UV light not absorbed by the UV absorber is absorbed by the polymeric matrix and over long exposure times contributes to damage of the polymeric matrix material as described above, i.e., discoloration, surface damage such as a haze or loss of surface gloss, and property loss, such as resistance to impacts.

U.S. Pat. No. 4,446,262 discloses a phot-stabilized polymer composition having a cyclic imino ester as an ultraviolet absorber.

U.S. Pat. No. 5,108,835 discloses a coextruded thermoplastic sheet having a 5 to 100 micron thick surface layer. The surface layer includes from 0.1 weight % to 20 weight % of an UV absorber. The thermoplastic material includes thermoplastic aromatic polycarbonates, thermoplastic aromatic polyester carbonates, thermoplastic aromatic polyester, thermoplastic aliphatic-aromatic polyesters of iso- and/or terephthalic acid, polyvinyl chloride, polyvinylidene chloride, thermoplastic copolymers of styrene and/or methyl styrene with maleic anhydride and/or with acrylonitrile, thermoplastic graft polymers of styrene and acrylonitrile on polybutadiene rubbers, thermoplastic poly-α-olefins, such as polyethylene and polypropylene, thermoplastic polyacrylates and polymethacrylates.

U.S. Pat. Nos. 5,558,912 and 5,480,926 disclose a polyethylene terephthalate based copolyester containing 1,4-cyclohexanedimethanol and an ultraviolet absorber selected from cyclic imino esters.

U.S. Pat. No. 5,709,929 discloses a multi-layered plastic sheet having a core section that includes a copolymer prepared by the reaction of dimethyl terephthalate or terephthalic acid with a mixture comprising about 99–55 mole % ethylene glycol and about 1–45 mole % 1,4-cyclohexane dimethanol. The second layer, which has a thickness of between about 2 microns and about 100 microns, overlies one surface of the core section and includes the copolyester of the core section and a UV light-absorbing additive, which preferably includes a benzotriazole or a benzophenone as the light absorbing additive.

DE 2,853,631 A1 discloses that copolyesters of polyethylene terephthalate modified with 1,4- cyclohexanedimethanol are desirable for outdoor use but with a low CHDM content they cannot be adequately stabilized by a benzotriazole compound.

Many UV absorbing compounds have been developed over the years of research in this area. It is also well known that many of these compounds are very specific to the polymer systems they are used in. Certain benzoxazinone compounds are disclosed as ultraviolet absorbers in U.S. Pat. No. 4,446,262. The disclosed benzoxazinones are said to be capable of melt mixing with various polymers. Specifically mentioned thermoplastic polymer classes are polyesters, polyamides, polycarbonates, polyolefins, polyesters and polysulfones. Specifically mentioned polyesters are polyethylene terephthalate, polytetramethylene terephthalate and polyethylene 2,6-naphthalate. These are stated to be optionally copolymerized with trifunctional or higher functional comonomers but no mention of coglycols is made for these materials.

The benzoxazinone compounds disclosed in U.S. Pat. No. 4,446,262 are also disclosed in U.S. Pat. No. 5,251,064 as being useful in a reflecting structure consisting of a metalized polyester layer of the same polyesters as disclosed in U.S. Pat. No. 4,446,262. The preferred polyester in U.S. Pat. No. 5,251,064 is stated to be polyethylene terephthalate.

Other UV absorbers that would result from the substitution of various functional groups onto the aromatic ring(s) of the benzoxazinone system are broadly mentioned in U.S. Pat. No. 4,446,262, and more specifically, in U.S. Pat. No. 5,264,539. In U.S. Pat. No. 5,264,539, for example, an oligomer containing benzoxazinone units is blended with a polyester.

Accordingly, there is still a need for polyester and copolyester blends that are UV light-stabilized suitable for use in outdoor applications.

SUMMARY OF THE INVENTION

Surprisingly, it has now been discovered that weatherable polyester and copolyester sheet constructions can be manufactured when a protective layer containing an effective amount of an UV light absorbing compound is incorporated into the product. The protective layer is a polyethylene terephthalate based copolyester containing certain amounts of 1,4-cyclohexanedimethanol, isophthalic acid and an ultraviolet absorber selected from benzoxazinones, dimeric benzotriazoles and triazines.

Another aspect of the present invention is a method for protecting from UV radiation a thermoplastic article which includes the step of applying to the thermoplastic article a protective layer of a polyethylene terephthalate based copolyester containing certain amounts of 1,4-cyclohexanedimethanol, isophthalic acid and an ultraviolet absorber selected from benzoxazinones, dimeric benzotriazoles and triazines.

This invention produces an unexpected benefit in retaining clarity and physical properties over that of the prior art.

It is an object of the present invention to provide an UV light stabilized copolyester blend.

It is another object of the present invention to provide a thermoplastic, and preferably a polyester, article having improved clarity and physical properties over that of the prior art when exposed to prolonged UV radiation.

These and other objects and advantages of the present invention will become more readily apparent in view of the following description.

DETAILED DESCRIPTION OF THE INVENTION

In accordance with the present invention, an UV radiation stabilized polymer composition includes a polyethylene terephthalate based copolyester having 1,4-cyclohexanedimethanol, an effective amount of an UV radiation absorbing compound selected from benzoxazinones, dimeric benzotriazoles, triazines and mixtures thereof, and from 5 mol % to about 40 mol % of isophthalic acid present in the copolyester wherein the mole percent of the isophthalic acid is based on 100 mole percent of dicarboxylic acid or equivalents.

Generally, the copolyesters of the present invention have residue repeat units from a diacid and a diol wherein 95 mole % to about 60 mol % of the diacid is terephthalic acid or suitable synthetic equivalents such as dimethyl terephthalate. Typical methods describing the preparation of polyethylene terephthalate based copolyester resins useful in the blend of this invention are well known and, for example, are disclosed in U.S. Pat. Nos. 2,465,319 and 3,047,539. Desirably, the polyethylene terephthalate based copolyester contains residues of from 95 mole % to about 70 mol % terephthalic acid and more preferably from about 95 mol % to about 80 mol % terephthalic acid.

Optionally, the terephthalic acid component of the diacid may contain up to about 5 mole % of one or more different diacids other than terephthalic acid. Such additional diacids include aromatic dicarboxylic acids having 8 to 14 carbon atoms, aliphatic dicarboxylic acids having 4 to 12 carbon atoms, or cycloaliphatic dicarboxylic acids preferably having 8 to 12 carbon atoms. Desirably, the aforementioned additional dicarboxylic acid is selected from phthalic acid, naphthalene-2,6-dicarboxylic acid, cyclohexanedicarboxylic acid, cyclohexanediacetic acid, succinic acid, glutaric acid, adipic acid, azelaic acid, sebacic acid, and mixtures thereof.

The polyethylene terephthalate based copolyester resins useful in the blend of the present invention further includes from 5 mol % to 40 mol % isophthalic acid residues. Desirably, the copolyester contains from about 5 mol % to about 30 mol %, and preferably from about 5 mol % to about 20 mol % isophthalic acid residues. It is to be understood that the sum of the mole percents for the above diacids equal 100% of the diacid residues in the copolyester resins of the present invention. It should be further understood that use of the corresponding acid anhydrides, esters, and acid chlorides of these acids is included in the term "dicarboxylic acid".

The diol residue moiety of the polyethylene terephthalate based copolyester is from about 60 mol % to about 95 mol % ethylene glycol. Desirably, the diol residue moiety of the polyethylene terephthalate based copolyester is from about 65 mol % to about 80 mol % ethylene glycol and more preferably from about 65 mol % to about 75 mol % ethylene glycol.

The ethylene glycol may further be modified with up to about 10 mol % and desirably less than about 5 mol % of one or more different diols. Such modifying diols include cycloaliphatic diols having 6 to 20 carbon atoms and aliphatic diols having 3 to 20 carbon atoms. Desirably, the aforementioned modifying diols are selected from propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2-ethylhexanediol-(1,3); 2,2-diethylpropane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; 2,2-bis-(4-hydroxypropoxyphenyl)-propane and mixtures thereof.

The polyethylene terephthalate based copolyester resins useful in the blend of the invention further includes from 5 mol % to about 40 mol % of 1,4-cyclohexanedimethanol residues, preferably from about 20 to 35 mol %, and more preferably from about 25 to about 35 mol % 1,4-cyclohexanedimethanol residues. It is to be understood that the sum of the mole percents for the above diols equal 100% of the diol residues in the copolyester resins of the present invention.

It is critical to the invention that the copolyester contain at least 10 mol % of modification of the combined total of mol % modifying coglycol, i.e. 1,4-cyclohexanedimethanol, and the mol % of isophthalic acid. For outdoor applications, it is desired that the copolyester of the current invention have a glass transition temperature above about 70° C and preferably above about 75° C.

In accordance with the present invention, the polyethylene terephthalate based copolyester resins have blended therein an ultraviolet absorbing compound selected from benzoxazinones, dimeric benzotriazoles, triazines and mixtures thereof. Such materials are described in greater detail in U.S. Pat. Nos. 5,480,926 and 5,783,307, the entire disclosures of which are incorporated herein by reference. In general the ultraviolet absorbing compounds useful for blending are represented by the formula:

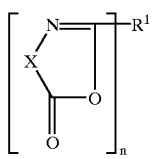

(I)

wherein $X^1$ represents a divalent aromatic residue in which the two bonds from $X^1$ are at the 1- and 2-positions; n is 1, 2 or 3; and $R^1$ represents a hydrocarbon residue having a valence of n which may further contain a hetero atom, or $R^1$ may be a direct bond when n is 2, in the unreacted state.

In general formula (I), $X^1$ is a divalent aromatic residue in which two bonds from $X^1$ are at the 1- and 2-positions; n is 2, and $R^1$ is a hydrocarbon residue having a valence of n which may farther contain a hetero atom, or $R^1$ may be a direct bond.

Preferred examples of $X^1$ include 1,2-phenylene, 1,2-naphthylene, 2,3-naphthylene, and groups represented by formulas (a) and (b), wherein formula (a) is:

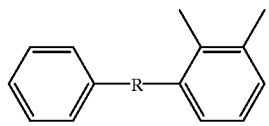

(a)

and formula b is

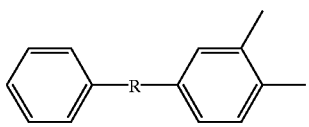

(b)

wherein R for formulas (a) and (b) is —O—, —CO—, —S—, —$SO_2$—, —$CH_2$—, —$(CH_2)_2$— or —$C(CH_3)_2$—.

Of these, 1,2-phenylene is preferred.

The aromatic residue for $X^1$ exemplified above may be substituted by substituents, for example, alkyl groups having 1 to 10 carbon atoms, such as methyl, ethyl, propyl, hexyl and decyl; aryl groups 6 to 12 carbon atoms such as phenyl and naphthyl; cycloalkyl groups having 5 to 12 carbon atoms such as cyclopentyl and cyclohexyl; aralkyl groups having 8 to 20 carbon atoms such as phenethyl; alkoxy groups having 1 to 10 carbon atoms such as methoxy, ethoxy and decyloxy; nitro; halogens such as chlorine and bromine; and acyl groups having 2 to 10 carbon atoms such as acetyl, propionyl, benzoyl and decanoyl.

$R^1$ is a hydrocarbon residue having a valence of n=2 or it may be a direct bond.

The divalent hydrocarbon residue (n=2) firstly includes, for example, unsubstituted aliphatic residues having 2 to 10 carbon atoms, unsubstituted aromatic residues having 6 to 12 carbon atoms, and unsubstituted alicyclic residues having 5 to 12 carbon atoms. Examples of the unsubstituted aliphatic residues having 2 to 10 carbon atoms are ethylene, trimethylene, tetramethylene and decamethylene. Examples of the unsubstituted aromatic residues having 6 to 12 carbon atoms are phenylene, naphthylene and p,p'-biphenylene. Examples of the unsubstituted alicyclic residues having 5 to 12 carbon atoms include cyclopentene and cyclohexylene.

Secondly, examples of the divalent hydrocarbon residue include groups represented by the following formula (c)

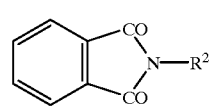

(c)

wherein $R^2$ is any one of the groups of formulae (d)–(h) defined below:

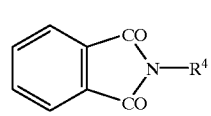

(d)

wherein $R^4$ represents an alkylene of 2 to 10 carbon atoms, phenylene or naphthylene;

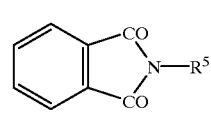

(e)

wherein $R^5$ represents an alkyl having 1 to 10 carbon atoms, a phenyl or a naphthyl;

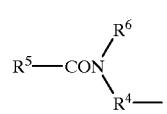

(f)

wherein $R^4$ and $R^5$ are as defined above, and $R^6$ is hydrogen atom or any one of the groups defined for $R^5$ and a group represented by formula (g) below:

(g)

$$R^4-CON\begin{matrix}R^6\\R^7-\end{matrix}$$

wherein $R^4$ and $R^6$ are as defined above, and $R^7$ is hydrogen or any one of the groups defined for $R^5$ and substituted aliphatic or aromatic residues of formula (h) below:

(h)

$$R^2-CON\begin{matrix}R^8-\\R^9\end{matrix}$$

wherein $R^2$ is as defined above, $R^8$ is any one of the groups defined for $R^4$, and $R^9$ is any one of the groups defined for $R^6$.

When n is 2, $R^1$ is preferably a direct bond or any one of the unsubstituted or substituted aromatic hydrocarbon residues in the first to third groups. Those unsubstituted or substituted aromatic hydrocarbon residues in the first or third group in which the two bonds extend from positions farthest from each other, above all p-phenylene, p,p'-biphenylene, and 2,6-naphthylene, are especially preferred.

Representative compounds of Formula (I) where n is 2 are:

2,2'-bis(3,1-benzoxazin-4-one),
  2,2'-ethylenebis(3,1-benzoxazin-4-one),
  2,2'-tetramethylenebis(3,1-benzoxazin-4-one),
  2,2'-hexamethylenebis(3,1-benzoxazin-4-one),
  2,2'-decamethylenebis(3,1-benzoxazin-4-one),
  2,2'-p-phetylenebis(3,1-benzoxazin-4-one),
  2,2'-m-phenylenebis(3,1-benzoxazin-4-one),
  2,2'-(4,4'-diphenylene)bis(3,1-benzoxazin-4-one),
  2,2'-(2,6- or 1,5-naphthalene)bis(3,1-benzoxazin-4-one),
  2,2'-(2-methyl-p-phenylene)bis(3,1-benzoxazin-4-one),
  2,2'-(2-nitro-p-phenylene)bis(3,1-benzoxazin-4-one),
  2,2'-(2-chloro-p-phenylene)bis(3,1-benzoxazin-4-one),
  2,2'-(1,4-cyclohexylene)bis(3,1-benzoxazin-4-one),
  N-p-(3,1-benzoxazin-4-on-2-yl)phenyl, 4-(3,1-benzoxazin-4-on-2-yl)phthalimide, and
  N-p-(3,1-benzoxazin-4-on-2-yl)benzoyl, 4-(3,1-benzoxazin-4-on-2-yl)aniline.

Especially preferred compounds are represented by the formula:

wherein $R^{10}$ represents a divalent aromatic hydrocarbon residue. Particularly preferred compounds of formula (I) include 2,2'-p-[phenylene-bis(3,1-benzoxazin-4-one), 2,2'-(4,4'-diphenylene)-bis(3,1-benzoxazin-4-one), and 2,2'-(2,6-naphthalene)bis(3,1-benzoxazin-4-one) are especially preferred. The compound, 2,2'-P-(phenylene)-bis(3,1-benzoxazin-4-one), is even more preferred.

The benzotriazole compounds are represented by the structure of formula II below:

(II)

wherein $X^2$ is an alkyl or aryl substituent or a halogen atom such as chlorine and $R^{11}$ is independently selected from alkyl or aryl groups having 1 to 20 carbon atoms. The $R^{11}$ moiety may be located on the ring but is usually located para- to the hydroxyl grouping for greatest synthetic ease.

A representative structure from the class of triazine compounds is formula III below:

(III)

wherein $R^{13}$, $R^{14}$, and $R^{15}$ are an alkyl or aryl group. Their position of substitution on the rings may be as desired but is generally ortho- and para- to the bond to the triazine ring for best synthetic ease. One or both of the two groups $R^{13}$ or $R^{14}$ may be hydrogen.

The amount of UV absorbing compound in the blend is from about 0.1 weight % to about 10 weight %, preferably from about 0.5 weight % to about 5 weight % and more preferably from about 0.5 weight % to about 4 weight %, wherein the weight % are based on the total weight of the blend.

The UV absorbing compound may be incorporated into the copolyester and at the desired concentrations by suitable blending and/or mixing technology such as by preparation of a concentrate of the UV absorbing compound in a base copolymer followed by pellet blending of the concentrate with further copolyester pellets containing no UV absorber, such that the final extruded product will be the copolyester with the desired overall level of UV absorber. The UV absorbing compound may be placed as the layer onto the plastic sheeting or film to be stabilized with the protective stabilized layer facing the light exposure shielding the sheeting from the effects of UV exposure. It is obvious that the protective layer can be on both sides of the sheet or film either for purposes of attenuating the effect of reflected radiation in a particular application environment or to render installation of the product foolproof. Suitable means for application of this protective layer include, but are not limited to, coextrusion, extrusion coating, extrusion lamination, calendaring, hot press lamination, solvent coating, and the like.

The copolyesters blends of the present invention are suitable for use in both the protective layer and the substrate layer of film or sheeting to which the protective layer is applied, however, it is preferred that the substrate layer be composed of a polymer composition different than the protective layer. Such copolymers have numerous advantages in fabrication over the homopolymers and exhibit a stabilization for color and impact retention of the exposed sheeting not present outside of this range to the same degree.

The structure of a coextruded product can be a film, a solid sheet or can be a profiled article. Many other configurations of such structures are possible, such as, having two or more layers of the sheeting connected by ribbing. The essential element of such structures is that they provide a great deal of rigidity of the final structure compared to the weight of the polymer employed therein. In these cases, the UV absorber containing layer is placed on either one side or both flat sides just the same as if it were a solid sheet.

The protective layer of film or sheeting need not be of the same copolyester composition as the substrate which does not contain the UV absorbing compound. The thickness of the protective layer on the underlying film or sheeting can vary according to the desired technological ends of the coating. This protective layer thickness will be governed by the concentration of UV absorber present and must be sufficient to absorb at least 90% of the harmful UV light prior to it reaching the underlying, polyester or copolyester. More preferably the protective layer should absorb 99% of the harmful UV radiation and even more preferably 99.9% of the UV radiation prior to it reaching the underlying material. As a general rule, using the UV absorber levels necessary for the practice of this invention, this protective layer need only be 1 mil (0.025 cm) in thickness in order to screen 99% of the incoming UV light in solar radiation and render the structure weathering resistant. As used herein "weathering resistant" means that the structure is resistant to a color change (b*) of less than about 3 units over 1536 hours of exposure to UVCON testing. Obviously this minimum thickness can be further reduced by higher concentration of the UV absorber in the protective layer. One must, however, be certain that this minimum thickness is present in the final part. Thus, if a sheet is thermoformed to make the final desired part, the protective layer thickness must be this minimum even where the protective layer has been thinned out by the drawing down in the thermoforming process.

The present invention also relates to shaped articles wholly or partially produced from the UV radiation stabilized polymer. Representative applications include, for example; signs for businesses, both stationary mounted and also portable ones, luggage carriers for the tops of the vehicles, sign boards, marquees on stores, solar roof panels, skylights, highway sound barriers, greenhouse panels, both in the sidewalls and the roofing thereof, separation walls in aquariums, aquariums themselves, recreational vehicle windows and vents, snowmobile, jet ski, golf cart, motorcycle and other such recreation vehicle windshields, bug screens or air deflection screens on cars and trucks or other such vehicles, transparent or translucent awnings, formed letters to be applied to the sides of buildings, letters to be used on signs, particularly those where the letters are changed at some frequency to change what the sign says, airport runway and taxiway marker signs, multiwall sheeting for use in signs, greenhouses, glazing applications and fluorescent or other light covers, etc., facia for soft drink and juice dispensing machines, etc. In these applications the product can be used either as a clear plastic part or it could be colored via producer added colors to give a clear, colored sheet or it could be printed on the back surface, in particular for sign and marquee applications to give the desired effects of highlighting letters, for example. This list is not intended to be all inclusive but merely representative of the vast number of applications available for a material having suitable properties.

The UV radiation stabilized polymer of the present invention may farther include the usual additives such as lubricants, antioxidants, optically active additives, colorants, pigments, fillers and fibers.

For the Examples below, the following procedures were followed:

Samples were cut from the-sheeting produced into 7.6 cm by 11.4 cm (3×4.5 inch) panels and exposed in a UVCON test device (available from Atlas electric Devices, Inc.) using 313B bulbs with a black panel temperature of 70° C. and a condensation cycle temperature of 40° C. The device was run on a cycle of 8 hours of having the lamps on followed by 4 hours of condensation having the lamps off. Samples were tested at 384 hour continuous increments of exposure inclusive of the condensation time.

Color and haze measurements were taken according to CIE recommendations using a HunterLab Ultrascan instrument employing a D65 light source with a 10° observation angle and specular included mode on the instrument. All samples were run in duplicate and the results averaged. Only the yellow-blue axis (+b* to –b* respectively) is reported as that is the one exhibiting the most significant change for a copolyester. Inherent viscosity (IV) was measured at 30° C. as a solution of 0.25 grams of polymer in 100 ml of 60:40 phenol:tetrachloroethane and expressed in units of dL/g.

The concentration of the isophthalic acid and 1,4-cyclohexandimethanol in the copolymer was verified by hydrolysis of the copolymer followed by GC analysis.

EXAMPLE 1

This example illustrates preparation of a copolyester which contains isophthalic acid containing an UV absorber in accordance with the disclosure of this invention. A copolyester of poly(ethylene terephthalate) copolymerized with 31 mol % of 1,4-cyclohexanedimethanol and 5 mol % of isophthalic acid was prepared in a 1 L glass reaction vessel by combining the following: 276.5 g (1.425 mol) dimethyl terephthalate, 14.6 g (0.075 mol) dimethyl isophthalate, 156.2 g (2.52 mol) ethylene glycol, 69.1 g (0.48 mol) 1,4-cyclohexanedimethanol and titanium tetraisoproxide solution in n-butanol, manganese acetate in ethylene glycol solution and cobalt acetate in ethylene glycol solution sufficient to give 32 ppm Ti, 45 ppm Mn and 60 ppm Co in the final polymer. The reaction flask, under a nitrogen blanket, was immersed in a molten metal bath held at 200° C. and stirring begun soon as all the reactants became molten. After 60 minutes the bath temperature was raised to 225° C. over a period of 10 minutes and held at this temperature for an additional 60 minutes. A solution of MERPOL A, a mixed ethoxylated phosphorous ester available from DuPont, was added to give 65 ppm P in the final polymer and the bath temperature raised to 275° C. over 30 minutes. Upon reaching 275° C., a vacuum was applied and the reaction vessel pressure reduced to 200 torr over 5 minutes, then 100 torr over 5 minutes, 10 torr over 5 minutes and finally 0.2 to 0.5 torr over 5 minutes. The reaction was stirrer at this final pressure for 12 minutes followed by 6 minutes at reduced stirrer speed. The flask was removed from the bath, allowed to cool under nitrogen at atmospheric pressure and the product isolated. Granulated polymer from ten such runs were combined (successive polymer preparations IV's were measured from 0.55 to 0.60), dried at 60° C. overnight. The granulated polymer was run through a counter-rotating twin-screw extruder with the barrel temperature set in the four zones of 150, 270, 270 and 270° C. and a nominal residence time of about 70 minutes (109.2 g/hr extrusion rate). The input hopper was held under nitrogen purge and preheated nitrogen gas at a nominal 285° C. was used as a purge at the vent port half way down the extruder barrel at a flow rate of 38 SCFH. The product IV was measured as about 0.75.

EXAMPLE 2

This example illustrates the use of a protective layer prepared from the copolyester of example 1. The copolyester of Example 1 was blended with 2,2'-(1,4-phenylene)bis(4H-3,1-benzoxazin-4-one) in proportion to produce a final mixture that contains 98.2 percent by weight of the copolyester and 1.8 wt % of the 2,2'-(1,4-phenylene)bis(4H-3,1-benzoxazin-4-one). This physical blend was coextruded as the top layer on a thicker layer of a copolyester consisting of poly(ethylene terephthalate) modified with 31 mol % 1,4-cyclohexanedimethanol (trade name SPECTAR, available from Eastman Chemical Company, Kingsport, Tenn.) which constituted the base layer of the construction. Barrel temperatures on the main and satellite extruders were uniformly set at 240° C. The example 1 copolyester layer was approximately 125 microns (5 mils) in thickness and the overall sheeting thickness was 3 mm (118 mil). The sheet was cut into 7.62 cm by 11.43 cm (3×4.5 inch) pieces and tested as described above using a UVCON device. A comparison copolymer was also extruded where the protective layer was only the SPECTAR copolymer containing 1.8 wt % of 2,2'-(1,4-phenylene)bis[4H-3,1-benzoxazin-4-one]. The color, expressed as the b* value for the materials, vs. exposure time results are shown in the following table:

TABLE 1

| Time (hrs) | Example 2 (b*/haze (%)) | Comp. Material (b*/haze (%)) |
|---|---|---|
| 0 | 0.08/0.88 | 0.11/0.79 |
| 384 | 2.27/6.12 | 2.68/6.29 |
| 768 | 2.20/4.78 | 2.59/9.77 |
| 1152 | 1.98/7.24 | 2.40/9.12 |
| 1536 | 2.26/4.38 | 2.32/9.74 |

By comparing within each exposure increment, it is clear from the results of this testing that the copolyester of this example exhibits somewhat better color retention to that of the prior art (comparison copolyester) along with significantly improved haze of the final test piece.

EXAMPLE 3

This example illustrates that the beneficial effect of isophthalic acid on the color retention of exposed sheeting is not observed at levels less than about 5 mol. %. A 10 kg batch of a copolymer was prepared based on poly(ethylene terephthalate) modified with 30 mol % of 1,4-cyclohexanedimethanol and 2 mol % of isophthalic acid. Sheets of 3 mm (115 mil) thickness were extruded using this copolymer. A 125 micron (5 mil) thick cap layer of this copolymer also containing 1.8 wt % of 2,2'-(1,4-phenylene) bis[4H-3,1-benzoxazin-4-one] was coextruded, as described in Example 2, onto a copolyester sheet to form a sheet having a total thickness of 3 mm (118 mils). Samples from this sheet were tested in a UVCON device along with samples of a comparison copolyester where the isophthalate moieties were absent. The b* and haze values results are shown in the following table:

TABLE 2

| Time (hrs) | Example 3 (b*/haze (%)) | Comp. Material (b*/haze (%)) |
|---|---|---|
| 0 | 0.45/1.4 | 0.91/1.5 |
| 1536 | 4.06/12.8 | 4.41/11.3 |

It is readily seen from the data above that the 2 mol % modification level was insufficient to significantly affect either the color development or the haze level of the material after UVCON exposure relative to the control material.

EXAMPLE 4

This example illustrates that levels of isophthalic acid modification within the limits of this invention have a beneficial effect on both color and haze developments in exposed samples. Ten kg batches of copolymers were prepared containing 30 mol % 1,4-cyclohexandimethanol modification with varying levels of isophthalic acid modification. After 1536 hours of UVCON exposure the b* and haze values results are shown in the following table:

TABLE 3

| Conc. of Isophthalate (mol %) | Change in b* After 1536 hours | Final haze % |
|---|---|---|
| 0 | 3.50 | 12.8 |
| 5 | 3.04 | 8.3 |
| 10 | 2.51 | 6.6 |
| 20 | 2.35 | 4.6 |
| 30 | 2.47 | 7.9 |

As can be seen from the data in Table 3, the copolymer modifications within the range of this invention all showed significant improvement over the control material, which represents the prior art, with lower change in color upon exposure and also less haze of the sheeting compared to the control material, both very desirable characteristics for materials being used in outdoor applications.

Having described the invention in detail, those skilled in the art will appreciate that modifications may be made to the various aspects of the invention without departing from the scope and spirit disclosed and described herein. It is, therefore, not intended that the scope of the invention be limited to the specific embodiments illustrated and described but rather it is intended that the scope of the present invention be determined by the appended claims and their equivalents.

What is claimed is:

1. A copolyester blend resistant to ultraviolet radiation comprising:
   a. a polyethylene terephthalate based copolyester having 1,4-cyclohexanedimethanol residues;

b. an effective amount of an ultraviolet radiation absorber selected from the group consisting of benzoxazinones, dimeric benzotriazoles, triazines and mixtures thereof; and c. from 5 mol % to about 40 mol % of isophthalic acid residues present in said copolyester wherein said mole percent is based on 100 mole percent of dicarboxylic acid or equivalents.

2. The UV resistant copolyester blend of claim 1 wherein said polyethylene terephthalate based copolyester has from 5 mol % to about 40 mol % 1,4-cyclohexanedimethanol residues, wherein said mol % is based on 100 mole percent of diol or diol equivalents.

3. The UV resistant copolyester blend of claim 1 wherein said polyethylene terephthalate based copolyester has from 20 mol % to about 35 mol % 1,4-cyclohexanedimethanol residues, wherein said mol % is based on 100 mole percent of diol or diol equivalents.

4. The UV resistant copolyester blend of claim 1 wherein said polyethylene terephthalate based copolyester has from 25 mol % to about 35 mol % 1,4-cyclohexanedimethanol residues, wherein said mol % is based on 100 mole percent of diol or diol equivalents.

5. The UV resistant copolyester blend of claim 1 wherein said polyethylene terephthalate based copolyester has from 5 mol % to about 30 mol %, isophthalic acid residues.

6. The UV resistant copolyester blend of claim 1 wherein said polyethylene terephthalate based copolyester has from 5 mol % to about 20 mol % isophthalic acid residues.

7. The UV resistant copolyester blend of claim 1 wherein said polyethylene terephthalate based copolyester includes up to about 10 mol % of a modifying diol selected from the group consisting of propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2-ethylhexanediol-(1,3); 2,2-diethylpropane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; 2,2-bis-(4-hydroxypropoxyphenyl)-propane and mixtures thereof.

8. The UV resistant copolyester blend of claim 1 wherein said polyethylene terephthalate based copolyester includes up to about 5 mol % of a diacid selected from the group consisting of phthalic acid, naphthalene-2,6-dicarboxylic acid, cyclohexanedicarboxylic acid, cyclohexanediacetic acid, succinic acid, glutaric acid, adipic acid, azelaic acid, sebacic acid, and mixtures thereof.

9. The UV resistant copolyester blend of claim 1 wherein said UV absorber is present in an amount of from about 0.1 weight % to about 10 weight %, wherein the weight % is based on the total weight of the blend.

10. The UV resistant copolyester blend of claim 1 wherein said UV absorber is present in an amount of from about 0.5 weight % to about 5 weight %, wherein the weight % is based on the total weight of the blend.

11. The UV resistant copolyester blend of claim 1 wherein said UV absorber is present in an amount of from about 0.5 weight % to about 4 weight %, wherein the weight % is based on the total weight of the blend.

12. A thermoplastic article comprising:
a. a first layer comprising a thermoformable polymeric material; and
b. a second layer comprising:

i. a polyethylene terephthalate based copolyester blend having from 5 mol % to about 40 mol % 1,4-cyclohexanedimethanol residues, wherein said mol % is based on 100 mole percent of diol or diol equivalents, ii. from about 0.1 weight % to about 10 weight % of an ultraviolet radiation absorber selected from the group consisting of benzoxazinones, dimeric benzotriazoles, triazines and mixtures thereof; and iii. from 5 mol % to about 40 mol % of isophthalic acid residues present in said copolyester wherein said mole percent is based on 100 mole percent of dicarboxylic acid or equivalents.

13. The thermoplastic article of claim 12 wherein said first layer is selected from the group consisting of polyesters and copolyesters.

14. The thermoplastic article of claim 12 wherein said polyethylene terephthalate based copolyester second layer has from 5 mol % to about 30 mol %, isophthalic acid residues.

15. The thermoplastic article of claim 12 wherein said polyethylene terephthalate based copolyester second layer has from 5 mol % to about 20 mol % isophthalic acid residues.

16. The thermoplastic article of claim 12 wherein said second layer has from about 0.5 weight % to about 5 weight % of said UV absorber.

17. The thermoplastic article of claim 12 wherein said second layer has from about 0.5 weight % to about 4 weight % of said UV absorber.

18. The thermoplastic article of claim 12 wherein said first layer is a film.

19. The thermoplastic article of claim 12 wherein said first layer is a sheet.

20. A method for protecting a polyester sheeting material from UV radiation comprising applying to at least one surface of said sheeting material a layer of resistant to ultraviolet radiation comprising:

a. a polyethylene terephthalate based copolyester blend having from 5 mol % to about 40 mol % 1,4-cyclohexanedimethanol residues, wherein said mol % is based on 100 mole percent of diol or diol equivalents, b. from about 0.1 weight % to about 10 weight % of an ultraviolet radiation absorber selected from the group consisting of benzoxazinones, dimeric benzotriazoles, triazines and mixtures thereof; and c. from 5 to about 40 mole percent of isophthalic acid residues present in said copolyester wherein said mole percent is based on 100 mole percent of dicarboxylic acid or equivalents.

21. The method of claim 20 wherein said polyethylene terephthalate based copolyester layer has from 5 mol % to about 30 mol %, isophthalic acid residues.

22. The method of claim 20 wherein said polyethylene terephthalate based copolyester layer has from about 0.5 weight % to about 4 weight % of said UV absorber.

23. The method of claim 20 wherein said UV resistant layer is present on at least two surfaces of said sheeting material.

* * * * *